(12) United States Patent
Rodgers et al.

(10) Patent No.: US 9,183,402 B2
(45) Date of Patent: Nov. 10, 2015

(54) PROTECTING SECURE SOFTWARE IN A MULTI-SECURITY-CPU SYSTEM

(71) Applicant: Broadcom Corporation, Irvine, CA (US)

(72) Inventors: Stephane Rodgers, San Diego, CA (US); Shashank Shekhar, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 366 days.

(21) Appl. No.: 13/707,023

(22) Filed: Dec. 6, 2012

(65) Prior Publication Data

US 2014/0052975 A1    Feb. 20, 2014

Related U.S. Application Data

(60) Provisional application No. 61/684,479, filed on Aug. 17, 2012, provisional application No. 61/729,169, filed on Nov. 21, 2012.

(51) Int. Cl.
  *G06F 9/00*      (2006.01)
  *G06F 15/177*    (2006.01)
  *G06F 21/60*     (2013.01)
  *G06F 21/57*     (2013.01)

(52) U.S. Cl.
  CPC ............ *G06F 21/602* (2013.01); *G06F 21/575* (2013.01)

(58) Field of Classification Search
  CPC ..... G06F 21/60; G06F 21/602; G06F 21/604; G06F 21/606; G06F 9/44502; G06F 9/44514; G06F 9/44523; G06F 11/1417; G06F 9/44505

USPC ........................................................ 713/1, 2
  See application file for complete search history.

(56) References Cited

U.S. PATENT DOCUMENTS

| | | | |
|---|---|---|---|
| 6,012,142 A | 1/2000 | Dokic et al. | |
| 6,599,194 B1 | 7/2003 | Smith et al. | |
| 7,624,261 B2 * | 11/2009 | Volp | 713/2 |
| 2003/0233553 A1 | 12/2003 | Parks et al. | |
| 2004/0034823 A1 | 2/2004 | Watkins et al. | |
| 2005/0138409 A1 | 6/2005 | Sheriff et al. | |
| 2005/0204155 A1 | 9/2005 | Ravi et al. | |
| 2007/0209072 A1 | 9/2007 | Chen | |
| 2007/0294745 A1 | 12/2007 | Tan et al. | |
| 2008/0219494 A1 | 9/2008 | Chen | |
| 2009/0110190 A1 | 4/2009 | Dolgunov et al. | |
| 2009/0187753 A1 * | 7/2009 | Gelman et al. | 713/2 |
| 2011/0161650 A1 * | 6/2011 | Paksoy et al. | 713/2 |
| 2012/0079287 A1 | 3/2012 | Leclercq | |
| 2013/0212671 A1 | 8/2013 | Wang et al. | |
| 2014/0164753 A1 * | 6/2014 | Lee | 713/2 |

FOREIGN PATENT DOCUMENTS

EP    1 868 127 A1    12/2007

OTHER PUBLICATIONS

Partial European Search Report for corresponding EP Application No. 13003755.9, dated Feb. 5, 2014 (6 pages).

* cited by examiner

*Primary Examiner* — Zahid Choudhury
(74) *Attorney, Agent, or Firm* — Brinks Gilson & Lione

(57) ABSTRACT

A computing system includes a first central processing unit (CPU) and a second CPU coupled with the first CPU and with a host processor. In response to a request by the host processor to boot the second CPU, the first CPU is configured to execute secure booting of the second CPU by decrypting encrypted code to generate decrypted code executable by the second CPU but that is inaccessible by the host processor.

20 Claims, 8 Drawing Sheets

PROTECTING SECURE SOFTWARE IN A MULTI-SECURITY-CPU SYSTEM

CROSS REFERENCE TO RELATED APPLICATIONS

This application claims the benefit of priority to U.S. Provisional Application No. 61/684,479, filed Aug. 17, 2012, and U.S. Provisional Application No. 61/729,169, filed Nov. 21, 2012, which are incorporated herein by reference.

TECHNICAL FIELD

This disclosure relates to system security performed by a security central processing unit (SCPU), and more particularly, to security functions performed in a system by multiple SCPUs operating at different security levels.

BACKGROUND

Rapid advances in electronics and communications technologies, driven by consumer demand, have resulted in the widespread adoption of data-driven devices, including those for handling and converting third-party media content. Third-party customers or clients want their content handled with security such that the content is not copied or used outside of certain permission levels. Systems that stream content digitally for multiple media providers to consumers seek to include higher levels of security so that competitor providers cannot access each other's secrets. In a large system on a chip (SOC), a single security central processing unit (SCPU) may perform security functions.

BRIEF DESCRIPTION OF THE DRAWINGS

The systems and methods may be better understood with reference to the following drawings and description. In the figures, like reference numerals designate corresponding parts throughout the different views.

FIG. 6 shows the first stage and FIG. 7 shows the second stage of a multi-stage boot process.

DETAILED DESCRIPTION

The discussion below makes reference to system security performed by a security central processing unit (SCPU), and more particularly, to security functions performed in a system by multiple SCPUs operating at different security levels. For purposes of explanation, two SCPUs are described, but more SCPUs can be implemented. The SCPUs may be instantiated on a system on a chip (SOC) such as may be used in a set top box (STB) for streaming media to consumers. Such media may include audio or audio/video content viewable by consumers on media devices.

In a large system on a chip (SOC) with a single security central processing unit (SCPU) that performs security functions, the system trust level may be binary: either the operation is highly secure, or it is completely untrusted. For operations that require an intermediate level of security, there exist two choices: (1) perform these operations in the SCPU; or (2) perform them in the host.

The first option may not be ideal because the SCPU may be responsible for highly sensitive tasks, like managing one time password (OTP) authentication, routing customer secrets, and the like. Mixing these highly sensitive tasks with lower security functions may create risk and detract from the main mission of the SCPU. The second option may not be ideal because performing intermediate security tasks in the host may leave the SOC unsecured, as the host CPU may not be trusted.

Executing security functions by a host on the chip may open up security too wide to provide sufficient security to chip operation. And, mixing highly secure and less secure functions as executed by a single SCPU may open system security up to some level of risk and detract from the main mission of a SCPU to secure the most sensitive functions of chip operation.

Furthermore, because the SCPU manages proprietary information to the SOC vendor, allowing the SCPU to be programmed by an end user customer may be problematic. Yet some of the intermediate level security tasks are better performed by end user code, and thus the SOC vendor may want to allow the customer to program aspects of SCPU functionality. To allow the user to program functions by the only SCPU on the chip may open up the security operation of the chip to additional risk and attack.

In an SOC, having a single SCPU may no longer be sufficient. Using a multi-security CPU approach, such as with a first SCPU dedicated for highly secure functions and a second SCPU used for lower security tasks, like digital rights management (DRM), managing transcoding, watermarking, etc. For purposes of explanation, the first SCPU is labeled security CPU-A herein, and the second security level SCPU is labeled security CPU-B.

Figure 1:
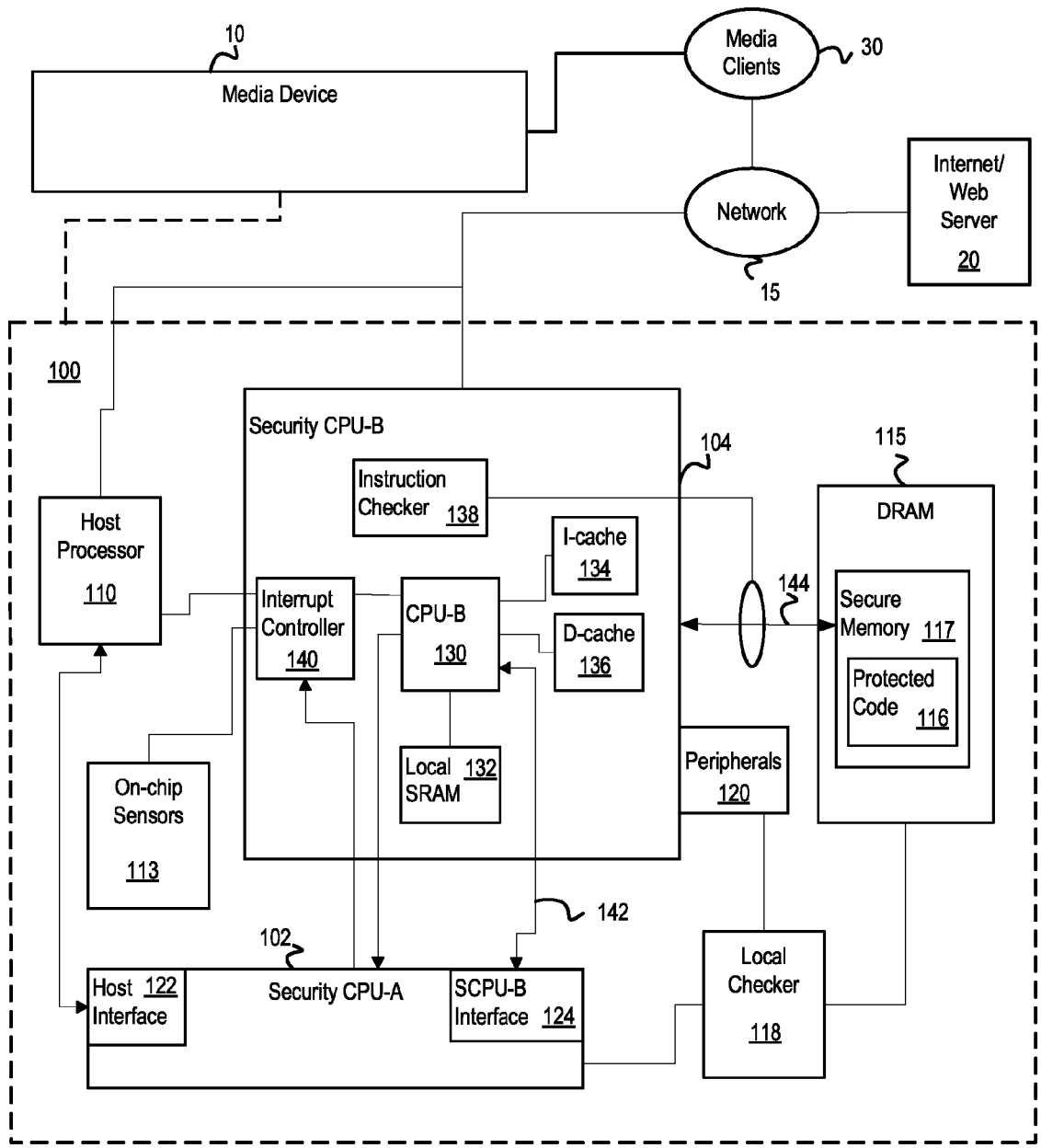
FIG. 1 is a block diagram of an exemplary multi-security central processing unit (CPU) system on a chip.

FIG. 1 is an example diagram of a multi-security central processing unit (SCPU) system on a chip (SOC) 100. The SOC 100 may be integrated within or coupled with a media device 10 when deployed into operation. The system 100 may include first SCPU 102 also referred to as security CPU-A, second SCPU 104 also referred to as CPU-B, and a host processor 110, the general-purpose processor that runs the majority of the chip operation. The security CPU-A may be smaller than the security CPU-B and be configured to operate at a first security level higher than a second security level at which security CPU-B operates. The security CPU-B may be provided a higher trust level than the host processor 110 and the host processor may be denied execution of the second security level functions. The host processor 110 may also, at least in part, be located outside of the SOC 100.

Functions of security CPU-A at the first security level may include, for example, managing root keys, performing an initial secure boot, and routing secrets of a third-party content provider. Functions of security CPU-B at the second security level include, for example, digital rights management, license management, transcoder management, watermarking, and manipulation of data in secure memory. The security CPU-A may be configured with software code that treats commands from the security CPU-B as privileged, and that generates multiple unique commands for execution by the security CPU-B that are not executable by the host processor 110.

As configured to perform the majority of the processor-intensive security functions, the security CPU-B may be nearly as powerful as the host processor 110 in some implementations, and may, for instance, at the time of filing, perform up to 1,000 or 1,500 or more Dhrystone million instructions per second (DMIPS). As such, the security CPU-B may be focused on lower security functions. Security CPU-A may need a fraction of the power and operate at less than 1,000 DMIPS.

The system 100 may further include on-chip sensors 113, memory such as dynamic random access memory (DRAM) 115, a local checker 118 coupled with the security CPU-A and multiple peripherals 120 of the security CPU-B. "Coupled with" herein can mean to be directly connected to a component or indirectly connected through one or more components. The DRAM 115 may include a portion of which is protected code 116 stored in secure memory 117. The secure memory 117 may be partitioned into specific or identified regions of the DRAM.

The security CPU-A may include a host interface 122 to communicate with the host processor 110 and an SCPU-B interface 124 with which to communicate with the security CPU-B. The security CPU-B may include a CPU-B 130, a local static random access memory (SRAM) 132, an instruction cache (i-cache) 134, a data cache (d-cache) 136, an instruction checker 138 and an interrupt controller 140. The local SRAM 132 may be private local memory for access by the security CPU-B in which instructions may be saved and data temporarily stored that is not accessible to the host processor 110 or to other on-chip entities or clients.

The security CPU-B and the security CPU-A may be coupled together with a dedicated, secure communications bus 142 that operates as a private channel between the CPU-B 130 and the security CPU-A. The secure communications bus 142 may be inaccessible by the host processor and inaccessible by third-party clients that exist on the SOC 100. The secure communications bus 142 may be configured with a combination of hardware and firmware and perform a master slave relationship in which, in some operations, the security CPU-A is either the master of or slave to the security CPU-B. For instance, the security CPU-A may be the master of booting CPU-B securely in memory. But, the security CPU-A may also receive commands from security CPU-B or the local checker 118, for instance.

A third party that exists on the SOC 100 may have its own CPU, its own block of logic, or exist on the chip as a combination of hardware and software having access to capabilities of the SOC 100. The third party CPU may include a secure interface managed by the CPU-A.

The system 100 may further include a common register bus 144 to which third-party clients that exist on the SOC 100 have access. The common register bus 144 may be used to write into registers of the memory 115. The security CPU-A may be configured to prevent certain on-chip clients from stopping security CPU-B from operating as intended, as disclosed herein.

The local checker 118, which may be coupled with the security CPU-A and security CPU-B, may be a piece of hardware configured to prevent some clients or hardware existing on the SOC 100 from accessing certain regions of the DRAM. Likewise, the local checker 118 may prevent blocking access by the security CPU-B to the common register bus 144 and/or to reading from and writing to the DRAM of the SOC 100.

The security CPU-A may also program the local checker 118 to ensure internal peripherals 120 of the security CPU-B are inaccessible by third-party entities having access to the host processor 110. The peripherals may include, but not be limited to, a Universal Asynchronous Receiver/Transmitter (UART), a timer, an interrupt, memory, data storage, a media device, or a combination thereof.

The instructions checker 138 may monitor instructions to be executed out of the DRAM and determine whether instructions called for execution from the secure memory by a component are cleared for execution by that component. To clear instructions for execution, the instruction checker 138 may ensure that the security CPU-B does not operate outside of a region of the secure memory 117 that has been authenticated for secure operation or conditional access by the host processor 110. For example, the instruction checker may monitor reads and writes to the DRAM 115 and compare the DRAM addresses of those memory accesses with an address range set up by the security CPU-A as a pre-authenticated region for execution of the instructions. If the security CPU-B attempts to execute instructions outside of the region of memory, the security CPU-B may be rebooted or the entire SOC be reset.

In one example, the content saved to the secure memory 117 may include media content that a client does not want distributed in an unauthorized manner. The security CPU-B may decrypt the content for viewing on a consumer device, but not allow other peripherals to access or distribute the content outside of the system 100. The security CPU-B may ensure a consumer can view the content but not be directly accessed by the host. The security CPU-A and CPU-B may set up hardware that limits certain chip components in their access to the secure memory 117. For example, the security CPU-A and security CPU-B may make a region of memory off limits to the host processor. Furthermore, the security CPU-B may perform watermarking or manipulate time stamps with regards to content that a consumer may view.

More particularly, the secure memory 117 may be accessible exclusively to the security CPU-A and CPU-B and to local decompression and rendering engines. Thus, the security CPU-B may decrypt content into this memory region and then local display processes may read the decrypted content for local rendering. None of these steps requires the host processor 110 to have access to the secure memory. The security CPU-B may ensure a secure data flow by decrypting the content into this restricted region, out of reach of the host processor.

The interrupt controller 140 may be coupled with the security CPU-A and be configured to monitor the on-chip conditions from data generated by the sensors 113. The on-chip sensors 113 may generate data related to attributes of the chip such as, for example, temperature, voltage levels at specific points on the chip, clock speed and the like. If one of these attributes varies too much or in the wrong way, it may be indicative of a potential intrusion or hacker trying to disrupt normal operation of the SOC that would allow access to secure data and/or secure operation. The interrupt controller 140 may aggregate and mask interrupts from other functional blocks of the SOC 100 that may include interrogation of the sensors to detect predetermined threshold values of those sensors for use in determining whether or not the interrupt controller 140 masks an interrupt.

Furthermore, the interrupt controller 140 may generate an interrupt or a hookup in response to detecting conditions indicative of an intrusion. The interrupt or hookup may adjust operation of the host processor 110 or the security CPU-B in real time to ensure secure system operation. The host processor may also have a separate memory buffer than the memory buffer the security CPU-B uses, where the memory buffer for the security CPU-B may be configured as not accessible by the host processor 110 and configured to provide control logic to the second security CPU-B.

The system 100 may communicate over a network 15 such as the Internet or any wide or local area network to communicate with a Web server 20 and media clients 30. The clients 30 may be the customers that procure the SOC 100 for use by consumers to stream media content to consumer media devices 10. The security CPU-B may obtain the time and day over the Internet from the Web server 20 using a secure protocol. The time and day may then be considered secure time and be stored by the security CPU-B in either the local SRAM 132 or the secure memory 117 in DRAM 115. So stored, the security CPU-B may prevent access by the host processor or other on-chip programmed components to the secure time, which may be used by digital rights management and other forms of lower level security functions during execution of the secure functions.

Figure 2:
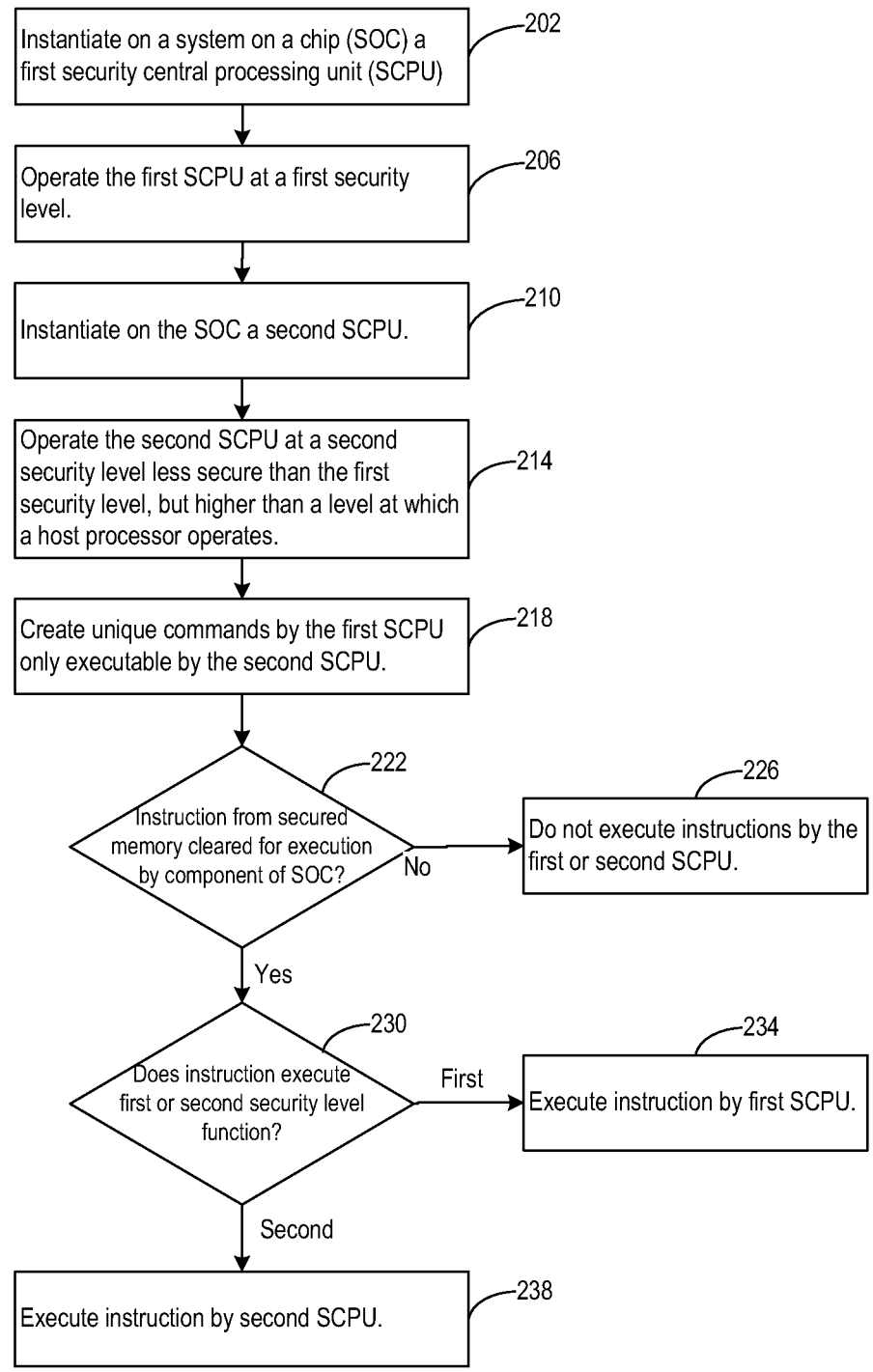
FIG. 2 is a flow chart of an exemplary method for implementing the multi-security CPU system on a chip of FIG. 1.

FIG. 2 is an example flow chart of a method for implementing the multi-security CPU system of FIG. 1. A system on a chip (SOC) may include a first security central processing unit (SCPU) and a second SCPU (202, 210). The SOC may operate the first SCPU at a first security level (206). The SOC may operate the second SCPU at a second security level less secure than the first security level, but higher than a level at which a host processor operates (214). The first SCPU may create commands only executable by the second SCPU (218).

The second SCPU may determine whether an instruction called for execution from secure memory is cleared for execution by a component of the SOC calling the instruction (222). If the component is not cleared to execute the instruction, neither the first nor the second SCPU are permitted to execute the instruction (226). If the component is cleared to execute the instruction, the second SCPU may determine whether the instruction executes a first or the second security level function (230). If the component requests to execute a first security function, the first SCPU executes the instruction (234). If the component requests to execute a second security function, the second SCPU executes the instruction (238). The first SCPU may also be the requestor component of either the first or second security functions and the second SCPU may be the requestor component of either first or second security functions, depending on the function.

Figure 3:
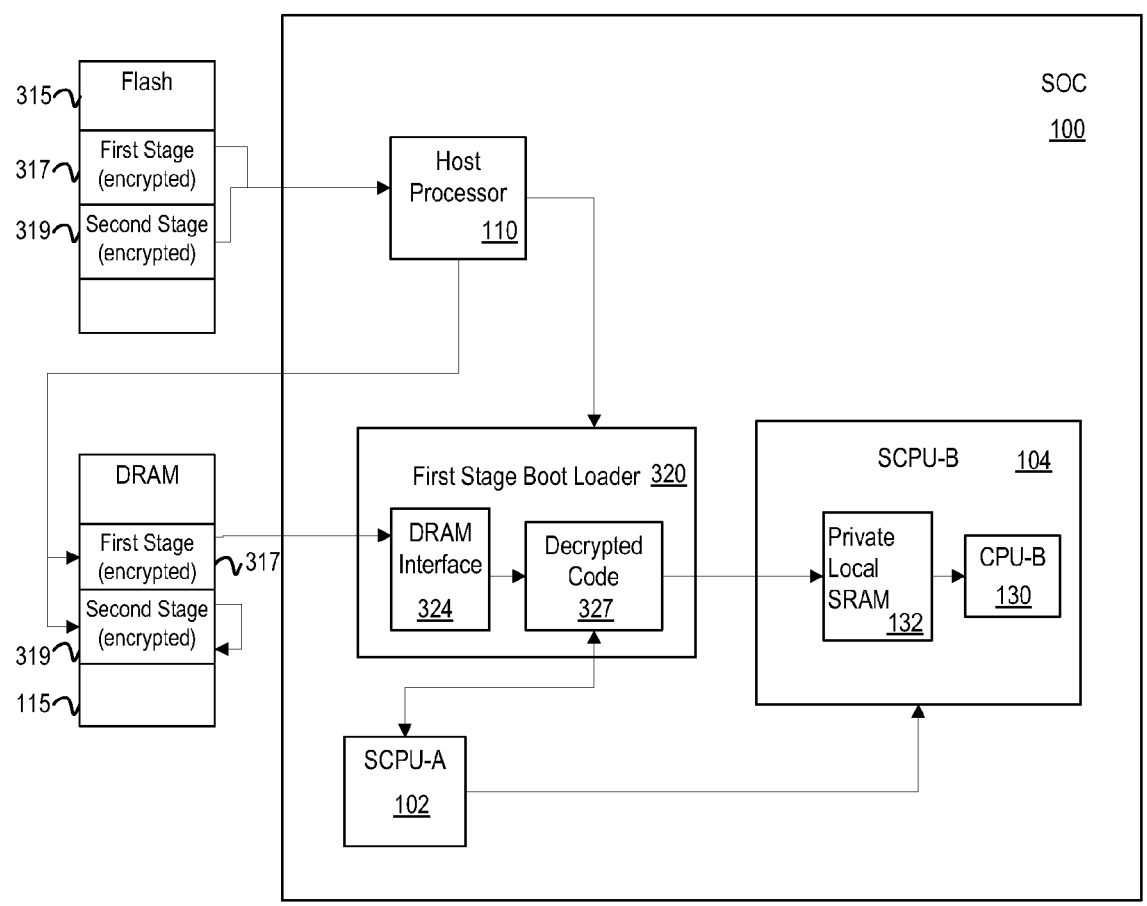
FIG. 3 is a block diagram of an exemplary first of multi-stages used to boot a security CPU-B by a security CPU-A.
Figure 4:
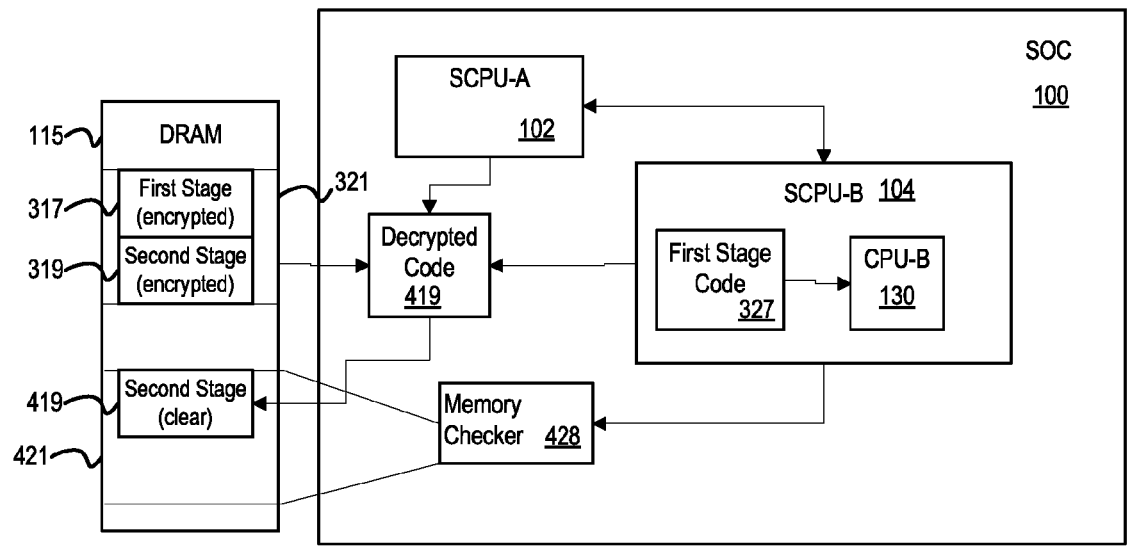
FIG. 4 is a block diagram of a second of two stages used to boot the security CPU-B by the security CPU-A.

FIGS. 3 and 4 are block diagrams of an exemplary multi-stage boot process by which the security CPU-A securely boots the security CPU-A. FIG. 3 shows execution of the first stage and FIG. 4 shows execution of the second stage. These stages may ensure that decrypted (or clear) code in the DRAM that is executed is not visible, and thus not accessible, to other than the SCPUs 102 and 104. To do so, the security CPU-A securely boots the security CPU-B by decrypting encrypted code to generate decrypted code in the DRAM 115 executable by the security CPU-B but that is inaccessible by the host processor.

More particularly, an encrypted first stage code 317 and an encrypted second stage code 319 are saved in flash memory 315. The host processor 110 may attempt to boot security CPU-A, and thus access the first and second stage encrypted codes. In response, the host processor 110 may be allowed to write the first and second stage codes 317 and 319 into the DRAM 115 from flash memory 315, but the first and second stage codes remain encrypted. The host processor 110 may then configure a first stage boot loader (FSBL) 320 that includes a DRAM interface 324. The DRAM interface reads the first stage code 317 from memory and the FSBL 320 decrypts the first stage code 317 and writes the decrypted code 327 into the private local SRAM 132 of the security CPU-B.

The security CPU-A may authenticate the decrypted code 328, either in place in the local SRAM 132 or on the fly as the decrypted code 327 is being written into the local SRAM 132. The security CPU-A may be further configured to authorize the security CPU-B to execute the decrypted code with the CPU-B 130 once authenticated. The decrypted first stage code 327 may be executed to make decisions with regards to how to load, decrypt and execute the second stage code.

With further reference to FIG. 4, in executing the decrypted first stage code 327 as a trusted kernel within the local SRAM 132, the security CPU-B may be configured to request the security CPU-A to generate a key usable to decrypt the second stage code. In response to the request, the security CPU-A may generate the key with specified access rights for use by the security CPU-B. The access rights may include a first region 321 of the DRAM 115 from which to decrypt the second stage code and a second region 421 of the DRAM to which to write the decrypted second stage code 419. For instance, the first region may be the region 321 where the second stage encrypted code 319 is stored, and the second region 421 may be where the decrypted second stage code 419 is designated for storage in FIG. 4 by the access rights created in the generated key.

The security CPU-B may work with the high-security CPU-A to create a memory checker 428, a special piece of hardware. The memory checker 428 may be configured to ensure decryption of the second-stage encrypted code 319 occurs only from the first region 321 to the second region 421 of memory in the DRAM 115. If the host processor attempts to write the decrypted second stage code 419 into memory outside of the second region 421, the memory checker 428 may alert the security CPU-B so that the code is not written outside of the second region or may force the decrypted second stage code to be written to the second region.

The security CPU-B may then decrypt the second stage code 319 using the key generated by the security CPU-A and write the decrypted second stage code 419 into the DRAM 115 at the second region 421. While the host processor 110 may access the first region it cannot access the second region. The security CPU-B can, however, access the second region to execute the decrypted second stage code. Accordingly, the second stage of the boot process ensures that when the decrypted second stage code 419 is saved to memory, the decrypted second stage code is executable upon request by the host processor, but without allowing the host processor to access the decrypted second stage code. As third-party clients of the SOC 100 have access to the host processor, the two-stage boot process ensures that third-party entities are not able to snoop on the decrypted second stage code 419 through pin snooping or the like.

Figure 5:
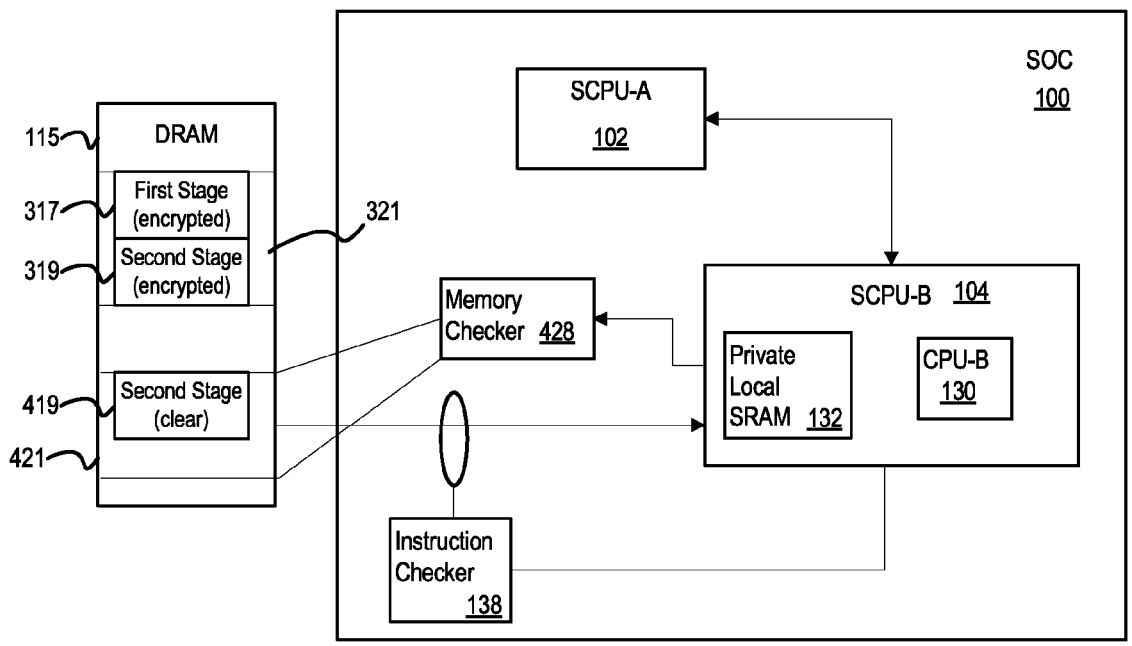
FIG. 5 is a block diagram of exemplary running of protected second stage code from memory after security CPU-B has been booted.

FIG. 5 is an example diagram of running the protected second stage code 419 from memory after the security CPU-B has been booted. The instruction checker 138 referred to earlier may also be configured to ensure execution of the decrypted second stage code 419 does not spread outside of the second region 421 of memory. The instruction checker 138 may monitor instructions of the decrypted second stage code 419 being called for execution by the host processor 110, and ensure that the execution remains within the second region 421 of secure memory of the DRAM 115.

When the host processor 110 attempts to execute an instruction from the decrypted second stage code outside of the second region 421 of the DRAM 115, the instruction checker 138 may block the execution of the instruction, or reset the SOC 100, causing a reboot of the security CPU-B. In the alternative, or in addition, the instructions checker 138 may alert the security CPU-B of the attempt so that the security CPU-B may perform the block or force execution of the instruction to the second region 421 of DRAM.

Figure 6:
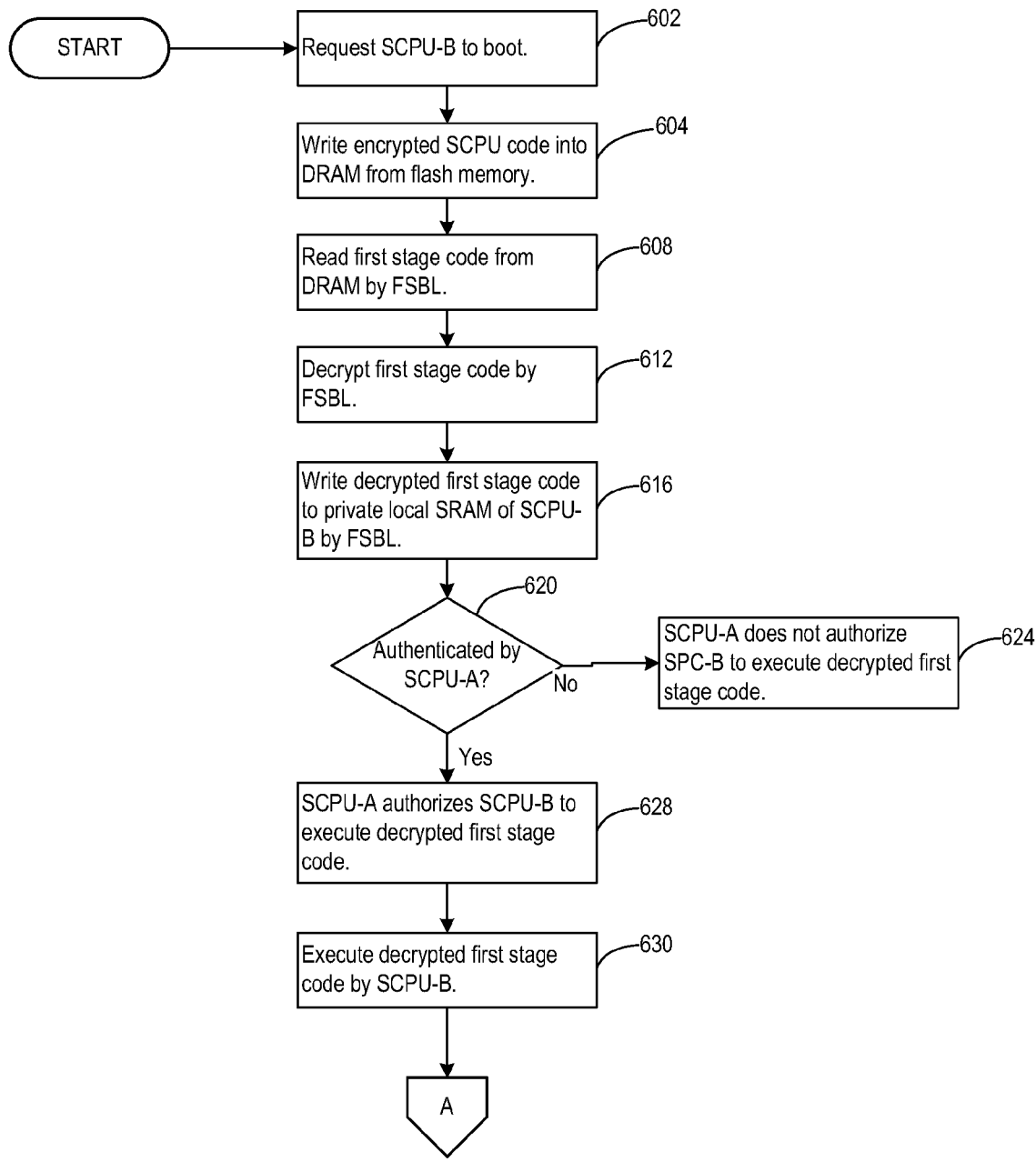
FIGS. 6 and 7 are a flow chart of an example method for protecting software in a multi-security-CPU system by securely booting security CPU-B by security CPU-A, where
Figure 7:
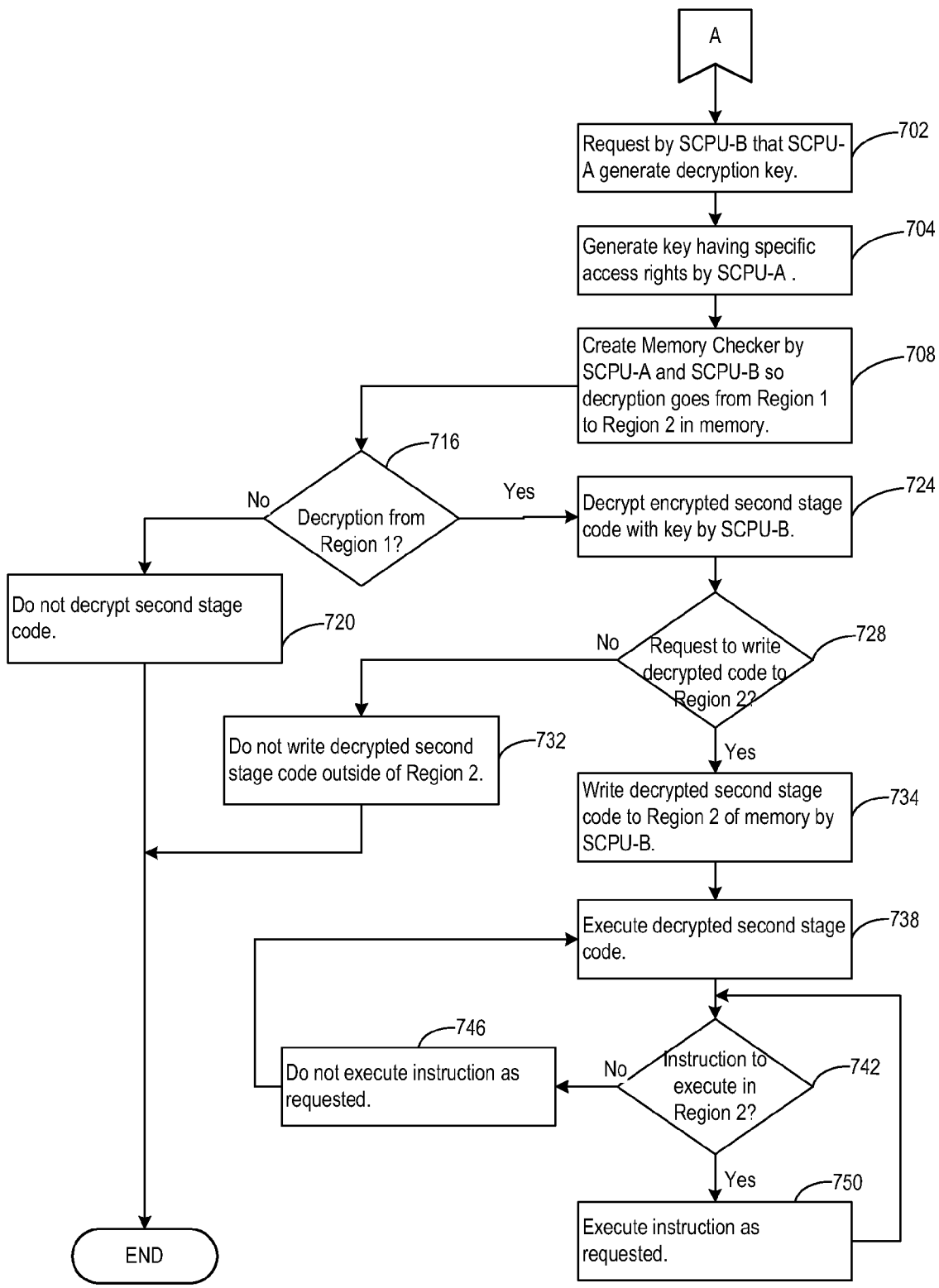

FIGS. 6 and 7 are a flow chart of an example method for protecting software in a multi-security-CPU system by securely booting security CPU-B by security CPU-A, where FIG. 6 shows a first stage and FIG. 7 shows a second stage of a two-stage boot process. The host processor begins the process when the SOC 100 boots up by requesting the security CPU-B to also boot up (602). The host processor writes encrypted SCPU code into the DRAM from flash memory (604), the encrypted SCPU code including encrypted first stage and second stage code.

The first stage boot loader (FSBL) reads the first stage code from DRAM (608). The FSBL decrypts the first stage code (612). The FSBL writes the decrypted first stage code to private local SRAM of the security CPU-B (616). The security CPU-A then authenticates the decrypted code, whether on the fly as it is decrypted or after being stored in local SRAM (620). When the decrypted code is not authenticated, the security CPU-A does not authorize the security CPU-B from executing the decrypted first stage code (624). When the decrypted code is authenticated, the security CPU-A authorizes the security CPU-B to execute the decrypted first stage code (628). The security CPU-B then executes the decrypted first stage code, when authorized to do so (630).

With reference to FIG. 7, while executing the decrypted first stage code, the security CPU-B requests the security CPU-A to generate a decryption key (702). The security CPU-A generates the key including specific access rights affiliated with the key (704). Those access rights may include a first region (Region 1) of DRAM from which the encrypted second stage code may be decrypted and a second region (Region 2) of DRAM to which the decrypted second stage code may be written and from which may be executed. The security CPU-B may work with security CPU-A to create a memory checker, a special piece of hardware that ensure decryption goes from Region 1 to Region 2 when the encrypted second stage code is decrypted (708).

When the host attempts decryption of the second stage code, the memory checker determines whether decryption is from Region 1 (716). When decryption is not from Region 1, the memory checker and the security CPU-B do not allow the decryption to take place (720). When decryption is from Region 1, the security CPU-B decrypts the encrypted second stage code with the key (724).

The memory checker then determines whether a request is received to write the decrypted code to Region 2 (728). When the memory checker determines the host processor attempts to write the decrypted second stage code to other than Region 2, the memory checker or the security CPU-B prevents the decrypted second stage code from be written outside of Region 2 of DRAM (732). When the memory checker determines the host processor requests to write the decrypted second stage code to Region 2, the security CPU-B writes the decrypted second stage code to Region 2 of the DRAM (734).

The security CPU-B may then execute the decrypted second stage code on behalf of the host processor (738). An instruction checker may determine whether the executed instructions are being executed within Region 2 of DRAM, one instruction at a time (742). When an instruction is to be executed outside of Region 2, the instruction checker may alert the security CPU-B so that the security CPU-B does not execute the instruction as requested or may force the instruction to be executed within Region 2 (746). When an instruction is to be executed inside of Region 2, the instruction checker may inform the security CPU-B to continue with executing instructions (750).

Figure 8:
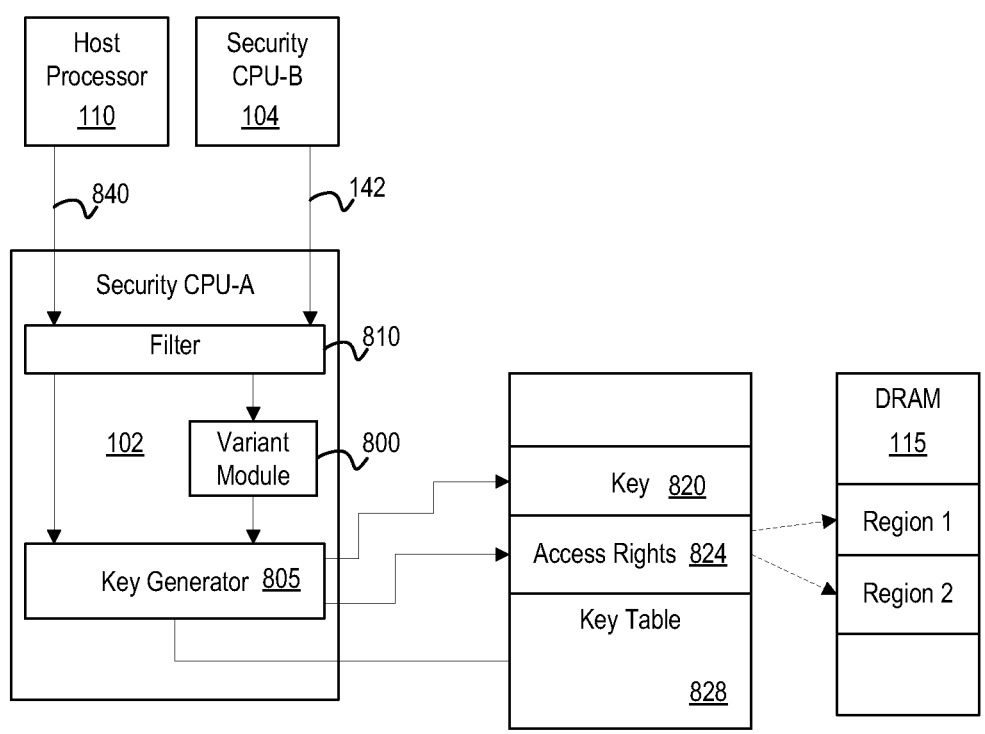
FIG. 8 is an exemplary block diagram of the exemplary system of FIG. 1 in which key separation between the security CPU-B and the host processor protects sensitive files from host access or decryption.

FIG. 8 is an example diagram of the system of FIG. 1 in which key separation between the security CPU-B 104 and the host processor 110 protects sensitive files from host access. Both the host processor 110 and the security CPU-B may request the security CPU-A to generate decryption keys for access to or decryption of the sensitive files, for use by software that would not otherwise be given access or the ability to decrypt the files.

These sensitive files may include those related to digital rights management (DRM) of propriety media such as audio or audio/video files or to other sensitive files. For example, in a DRM system, files may be protected from unsecure software by using special keys that are not known to the software. However, although the keys are not known, the commands used to decrypt the files are available to the host. This allows unsecure software to later send the command to decrypt the data in memory. Furthermore, it may be desirable to transmit commands from the security CPU-B to the security CPU-A to create a completely different key structure than the same commands issued from the host processor 110, to secure security CPU-A. Issuing separate commands may be done, as will be explained, in a way that the host cannot emulate the same keys.

Because the security CPU-B operates at a higher security level than the host processor, FIG. 8 shows how the system 100 may provide unique keys to the security CPU-B for exclusive access to files not provided to the host processor. The key generation described below may also be applied to root key generation, so that the security CPU-B may request the security CPU-A to generate a unique root key to decrypt a system or software file for execution by the system 100.

In one example, the security CPU-A includes a variant module 800, a key generator 805 and a filter 115. The key generator 805 generates keys 820 such as the key 820 displayed in FIG. 8. The key includes access rights 824, which include a designation of access to a specific, secure region of memory, such as Region 1 or Region 2 in the DRAM 115. Such designation of access may also include the right to write decrypted data to Region 1 or Region 2. A key table 828, which may also be stored in the DRAM 115 or other memory, provides links between keys 820 and corresponding access rights accessible by the security CPU-A. Once the security CPU-A generates a key and provides access to the security CPU-B or the host processor, then the security CPU-B (or the host processor) may access the region of memory containing the decrypted content. In the case of generation of a root key, the security CPU-B (or the host processor) may be able to decrypt a system or software file and write the decrypted file to the protected region of memory from where it may be executed.

In some cases, the security CPU-B needs a unique key generated with exclusive access that the host processor is not provided. As previously discussed, the security CPU-B may communicate with the security CPU-A through the secure, dedicate communications bus 142. This bus 142 may be physically and/or logically separate from a bus 840 through which the host processor communicates with the security CPU-A. The security CPU-B may issue a special command or request of the security CPU-A over the dedicated bus 142 to the variant module 800 for generation of a unique key. The variant module 800 may make multiple possible changes or variants available for selection by the security CPU-B. Upon selection of a change or variant, the key generator 805 may then apply the selected variant(s) to an algorithm used to generate the key. The key generator may apply the variant as done in a key ladder or hash algorithm so that if any step in the decryption is not carried out, then access is denied.

The filter 810 may authenticate access to the variant module 800 by the security CPU-B and deny access to the variant module 800 by the host processor 110. The filter 810 may also distinguish between commands or requests issued by the host processor 110 and the security CPU-B, e.g., that the commands/requests are respectively correctly indicated as coming from the host processor 100 and the security CPU-B for purposes of key generation and access to the secured regions of memory. With authenticated access using a request with which the security CPU-A generates a unique key, the security CPU-B may obtain exclusive access to sensitive files, including DRM-protected media content. In some cases, access may also be provided to a different region of memory for writing the content elsewhere in the DRAM 115. Where the key generated is a root key, the security CPU-B may gain exclusive decryption rights of system or software files for execution by the system 100 from protected regions in DRAM 115, regions inaccessible by the host processor 110.

Figure 9:
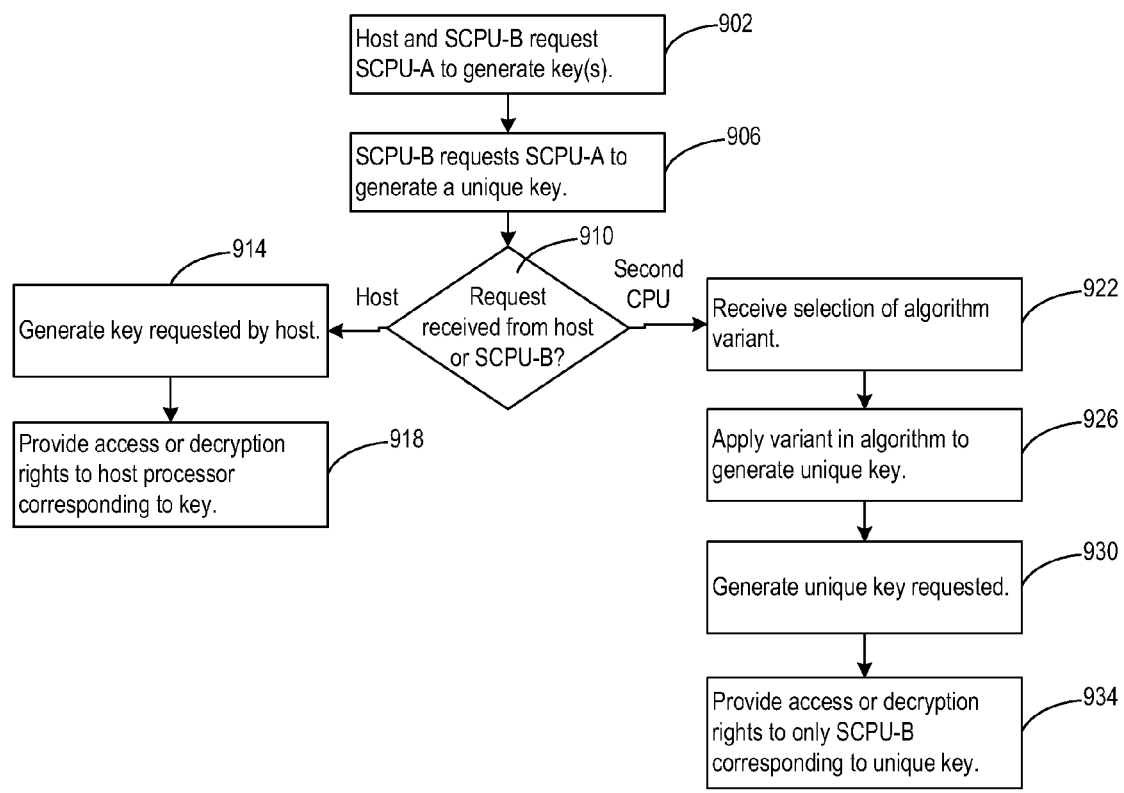
FIG. 9 is a flow chart of an exemplary method for executing key separation between the security CPU-B and the host processor that protects sensitive files from host access or decryption.

FIG. 9 is an example flow chart of a method for executing key separation between the security CPU-B and the host processor 110 that protects sensitive files from host access or decryption. The host processor and the security CPU-B both may request the security CPU-A to generate keys for access to and decryption of sensitive files as discussed with reference to FIG. 8 (902). The security CPU-B may request the security CPU-A to generate a unique key, to which the host processor does not have access (906).

The security CPU-A receives a request from the host or the security CPU-B to generate a key. The filter of the security CPU-A may determine whether the request is from the host or the security CPU-B (910). If the request is from the host, the security CPU-A may generate a key as requested for use by the host processor (914). The security CPU-A provides access or decryption rights to the host processor corresponding to the key (918).

If the request is from the security CPU-B, the security CPU-A may also receive selection of an algorithm variant through the variant module (922). The key generator of the security CPU-A may generate a unique key with use of the algorithm variant (930). The security CPU-A may provide access or decryption rights to the security CPU-B corresponding to the unique key exclusive of the host processor (934).

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A computing system, comprising:
a first central processing unit (CPU);
a second CPU in communication with the first CPU and with a host processor;
a memory;
an instruction checker circuitry,
where, in response to a request by the host processor to boot the second CPU,
    the second CPU is configured to execute a two-stage secure booting,
where the second CPU is configured to:
    execute first stage code to request, from the first CPU, decryption information to decrypt a second stage code of the two-stage secure booting;
    decrypt the second stage code stored in a first region of the memory;
    write the decrypted second stage code to a second region of the memory; and
    execute the second stage code of the two-stage secure booting, and
where, the instruction checker circuitry is configured to monitor execution of the second stage code by the second CPU, and in response to detection of an attempt to execute an instruction located outside of the second region of the memory, prevent execution of the instruction by the second CPU.

2. The computing system of claim 1, where the host processor is configured to write encrypted code, including the first stage code and the second stage code, for executing the two-stage secure booting into the memory.

3. The computing system of claim 2, where the the first and second CPUs are located on a system on a chip (SOC), and where a boot loader circuitry is configured to:
    read the first stage code from the memory;
    decrypt the first stage code on the SOC; and
    write the decrypted first stage code into a local memory accessible by the second CPU.

4. The computing system of claim 3, where the first CPU is further configured to:
    authenticate the decrypted first stage code for execution by the second CPU; and
    authorize the second CPU to execute the decrypted first stage code from the memory accessible by the second CPU.

5. The computing system of claim 3, where the decrypted first stage code is executable to make decisions regarding how to load, decrypt and execute the second stage code.

6. The computing system of claim 3, where in executing the decrypted first stage code, the second CPU is configured to request the first CPU to generate a key usable to decrypt the second stage code, in response to which the first CPU is further configured to:
    generate the key with specified access rights for use by the second CPU, the access rights including a first region of the memory from which to decrypt the second stage code, and a second region of the memory to which to write the decrypted second stage code; and
    aid the second CPU to configure a memory checker to ensure that the second CPU occurs only decrypts the second stage code from the first region and that the second CPU only writes the decrypted second stage code to the second region of the memory.

7. The computing system of claim 6, where the first region of the memory is accessible by the host processor and the second region of the memory is inaccessible by the host processor.

8. The computing system of claim 1, where the instruction checker circuitry is configured to:
monitor execution of instructions of the decrypted second stage code by the second CPU; and
prevent execution of the instruction that is located outside of the second region of the memory, and force execution of another instruction that is located within the second region of the memory.

9. The computing system of claim 8, where the instruction checker circuitry is further configured to reset the computing system in response to detection of the attempt to execute the instruction located outside of the second region of the memory.

10. The computing system of claim 1, where the first CPU operates at a first security level and the second CPU operates at a second security level less secure than the first security level.

11. A method for securing software in a multi-security central processing unit (CPU) system that includes a first and a second CPU communicatively coupled together, comprising:
receiving a request from a host processor to boot the second CPU;
decrypting, by a first stage boot loader circuitry, an encrypted first stage code and writing decrypted first stage code into a memory accessible by the second CPU;
executing, by the second CPU, the decrypted first stage code, where the executing comprises:
decrypting an encrypted second stage code from the memory; and
writing the decrypted second stage code at a designated region of the memory;
monitoring, by an instruction checker, an address of an instruction being executed by the second CPU during execution of the decrypted second stage code; and
alerting the second CPU, by the instruction checker, in response to the address of the instruction being executed by the second CPU being outside of the designated region.

12. The method of claim 11, further comprising:
reading, by the first stage boot loader of the host processor, the first stage code from the memory;
authenticating, by the first CPU, the decrypted first stage code for execution by the second CPU; and
authorizing, by the first CPU, the second CPU to execute the decrypted first stage code from the memory accessible by the second CPU.

13. The method of claim 12, further comprising:
requesting, by the second CPU, that the first CPU generate a key for decrypting the second stage code stored in a first region of the memory;
generating the key by the first CPU, the key including access rights to the first region of the memory from which to decrypt the second stage code and the designated region of the memory to which to write the decrypted second stage code; and
creating, by the first and second CPUs, a memory checker.

14. The method of claim 13, further comprising:
monitoring, by the memory checker, decryption of the encrypted second stage code attempted by the host processor;
determining, by the memory checker, whether decryption is from the first region to the designated region; and
in response to determining that decryption is attempted from other than the first region or to other than the designated region, alerting, by the memory checker, the second CPU of a decryption violation.

15. The method of claim 14, further comprising:
preventing, by the second CPU, the decryption of the encrypted second stage code or forcing the decrypted second stage code to be written to the designated region.

16. A computing system, comprising:
a first central processing unit (CPU);
a dynamic random access memory (DRAM) communicatively connected with the first CPU;
a flash memory;
a second CPU communicatively coupled with the first CPU and with the DRAM;
a host processor coupled with the first and second CPUs, with the DRAM and with the flash memory, the host processor configured to write encrypted code into the DRAM from the flash memory, the encrypted code including a first stage code and a second stage code for executing a two-stage boot process;
where the first CPU is configured to:
receive a request from the host processor to boot the second CPU;
in response to the request, decrypt the first stage code; and
write the decrypted first stage code into a memory region accessible by the second CPU;
where the second CPU is configured to execute the decrypted first stage code stored in the memory region accessible by the second CPU to:
decrypt the encrypted second stage code stored in a first region of the DRAM; and
write the decrypted second stage code into a second region of the DRAM; and
execute the decrypted second stage code from the second region of the DRAM; and
where a memory checker is configured to:
monitor that the encrypted second stage code is being read from within the first region of the DRAM and that the decrypted second stage code is being written within the second region of the DRAM by the second CPU; and
in response to the second CPU accessing DRAM outside of the first region and the second region, abandon the decryption of the encrypted second stage code such that the host processor cannot access either the decrypted first stage code or the decrypted second stage code after decryption.

17. The computing system of claim 16, further comprising a first stage boot loader executable to read the first stage code from DRAM, where the memory region accessible by the second CPU comprises a private local memory of the second CPU, and where the first CPU is further configured to:
authenticate the decrypted first stage code for execution by the second CPU; and
authorize the second CPU to execute the decrypted first stage code from the private local memory.

18. The computing system of claim 17, where the second CPU is further configured to request the first CPU to generate a key, in response to which the first CPU is further configured to generate the key including access rights comprising the first region of the DRAM from which to decrypt the second stage code and the second region of the DRAM to which to write the decrypted second stage code.

19. The computing system of claim 18, where the memory checker is configured to:
in response to the determination that decryption is attempted from other than the first region or the decrypted second stage code is being written to other than the second region, force the decrypted second stage code to be written to the second region.

20. A computing system, comprising:
a first central processing unit (CPU); and
a second CPU in communication with the first CPU and with a host processor,
where, in response to a request by the host processor to boot the second CPU, the first CPU is configured to boot the second CPU, where the boot comprises:
  decryption of encrypted code to generate decrypted code; and
  storage of the decrypted code within a designated region of a memory,
where the designated region is accessible by the second CPU but is inaccessible by the host processor; and
where an instruction checker is configured to:
  monitor execution of the decrypted code from within the designated region by the second CPU; and
in response to detection of an attempt to execute an instruction located outside of the designated region of the memory, prevent execution of the instruction by the second CPU.

* * * * *

UNITED STATES PATENT AND TRADEMARK OFFICE
CERTIFICATE OF CORRECTION

PATENT NO.      : 9,183,402 B2
APPLICATION NO. : 13/707023
DATED           : November 10, 2015
INVENTOR(S)     : Stephane Rodgers and Shashank Shekhar It is certified that error appears in the above-identified patent and that said Letters Patent is hereby corrected as shown below:

In the Claims

Column 10, line 32, delete the second occurrence of the word "the".

Column 10, line 60, delete the word "occurs".

Signed and Sealed this
Twenty-sixth Day of July, 2016

Michelle K. Lee
*Director of the United States Patent and Trademark Office*